INVENTORS
JEAN H. FELKER
ALEXIS A. LUNDSTROM
BY
ATTYS.

Dec. 5, 1961   J. H. FELKER ET AL   3,011,716
CLOSURE-TIME COMPUTERS
Filed Oct. 20, 1954   3 Sheets-Sheet 2

INVENTORS
JEAN H. FELKER
ALEXIS A. LUNDSTROM
BY
ATTYS.

Dec. 5, 1961 J. H. FELKER ET AL 3,011,716
CLOSURE-TIME COMPUTERS
Filed Oct. 20, 1954 3 Sheets-Sheet 3

*INVENTORS*
JEAN H. FELKER
ALEXIS A. LUNDSTROM
BY
ATTYS.

United States Patent Office 3,011,716
Patented Dec. 5, 1961

3,011,716
CLOSURE-TIME COMPUTERS
Jean H. Felker, Livingston, and Alexis A. Lundstrom, Sparta, N.J., assignors, by mesne assignments, to the United States of America as represented by the Secretary of the Navy
Filed Oct. 20, 1954, Ser. No. 463,633
10 Claims. (Cl. 235—193)

This invention relates to closure-time computers for land, sea, and air vehicles, and more particularly to the method and the electric and electronic means for computing the closure-time from range intelligence.

It is of utmost importance to personnel of land, sea, and air vehicles to get immediate and continuous estimates of the time that it will take another land, sea, or air vehicle, as a target vehicle, to close-in or collide where these vehicles are approaching one another. Closure-time computers are of particular importance to fighter personnel in evaluating enemy positions although such computers have peaceful commercial applications as well.

In the present invention, the closure-time is computed from information of range taken from range equipment as radar. An approximation to the minimum closing time for a target vehicle attacking a vehicle station can be obtained by dividing a range by the velocity of the target vehicle. This is a minimum closing time because it assumes that the target could turn instantly from its present direction towards the vehicle station. In practice, however, the calculation of the velocity of the target vehicle becomes rather complex and the information required for the computation is not readily available from range equipment as a radar system. Consideration was given to computing the closing time as a function of range and range rate, both of which are available from radar systems, although difficulty arises in treating range rate as the equivalent of velocity. This appears because the negative ratio of range to range rate is equal to the negative ratio of range rate to velocity multiplied by the secant of the angle between the velocity vector and the line of sight. From this equation it may be realized that the value of the negative ratio of range to range rate can be made to fluctuate between positive and negative limits of infinity with varying angles of approach which makes automatic evaluation impractical. By using maximum absolute values of the rate of change of range the minimum closing time can be computed which is of importance in evaluating the dangerousness of target vehicles. The present invention continuously evaluates the range information impressed thereon from a radar range system and memorizes only the maximum range rates for use in computing the closure-time. This memory characteristic of the invention functions whether the range information is received continuously or in steps from the radar system. Through differentiating and integrating circuits increments of range for increments of time are computed whereby the equation of closure-time, $Tc$, is solved by $$Tc = \frac{R}{\left|\frac{\Delta R}{\Delta t}\right|_{Max.}}$$

where R is the range, $\Delta R$ is the increment of range greater than a predetermined value equal to several standard deviations of the range error, and $\Delta t$ is the increment of time required for the target to move $\Delta R$ yards.

In computing the closure-time in the present invention, circuit means are further provided to select only those targets that are approaching and to reject those targets that are parting. The closure-time computer of this invention therefore considers the target range and, when the range has decreased by more than a predetermined number of yards set to equal several standard deviations of range error, measures the change in range in accordance with the time required for the change, divides the change in range by the increment of time and stores the maximum quotient value, and divides the range by the stored maximum quotient value to give the closure-time. It is therefore a general object of this invention to compute the closure-time of approaching objects from continuous, periodic, or random intelligence of range provided from range devices by computing and memory storing the maximum values of increments in range to increments in time and dividing the actual range by the stored maximum values.

These and other objects, advantages, features, and uses will become more apparent as the description proceeds when considered with the accompanying drawings, in which.

Computer system

Figure 1:
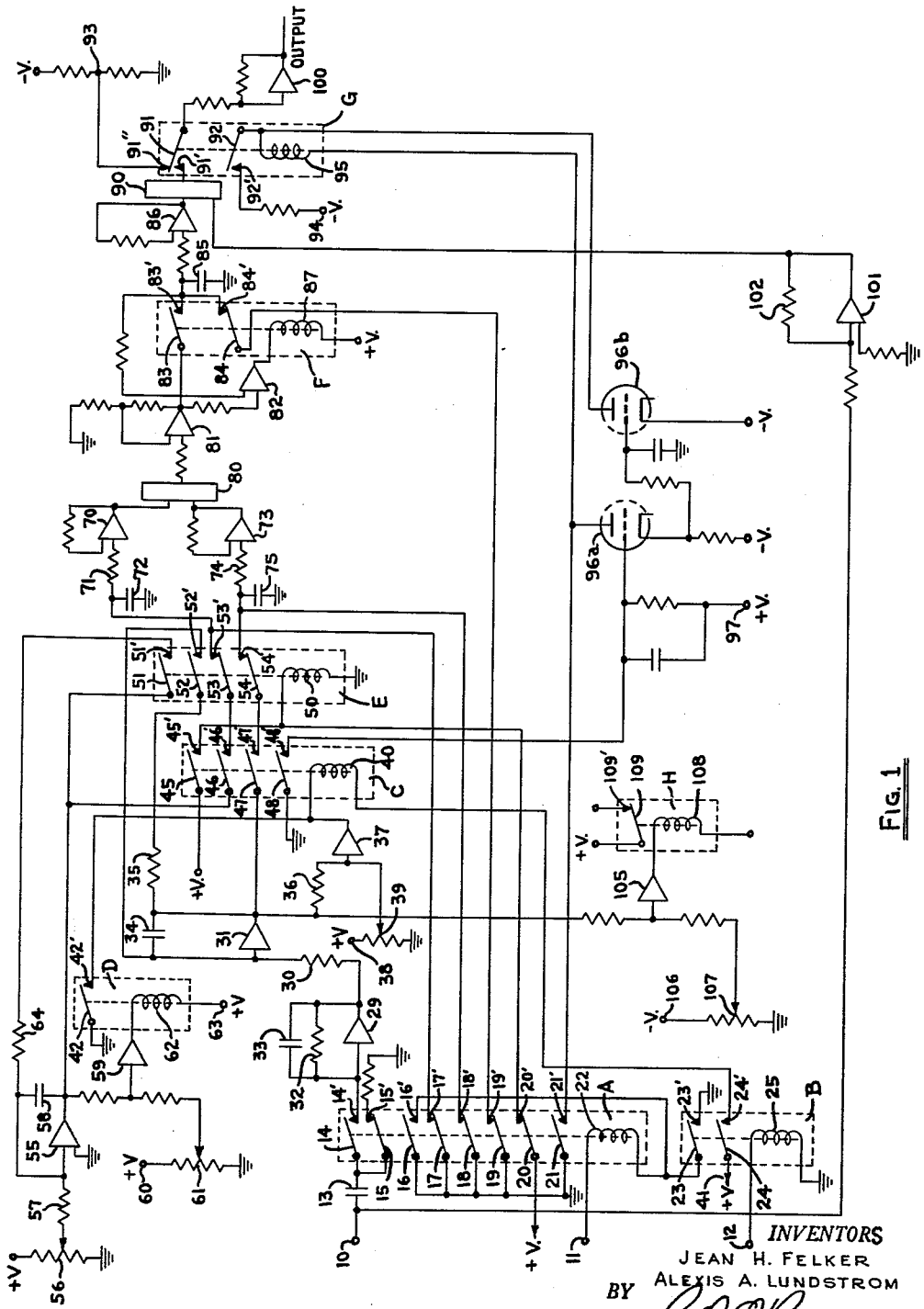
FIG. 1 is a schematic circuit diagram of the closure-time computer.

Referring to FIG. 1, the terminal 10 is adapted to be connected to the range intelligence output of a range device, as for example a radar range system. The terminal 11 is adapted to be coupled to a starter signal which may be independently operated or in circuit with the radar system. The terminal 12 is adapted to be coupled to the radar range system to provide a signal for every new step in range. Terminal 10 is connected through a condenser 13 to alternately seated switch contacts 14 and 15 of an electrical relay A, the relay A being shown in the static condition with contact 15 closed to ground through contact 15'. Switch contacts 16 to 19, inclusive, and 21 of relay A are all connected to ground, and switch contact 20 is coupled to a positive direct current (D.C.) source. Terminal 11 is connected through an electromagnet coil 22 of relay A to the contact 16' of relay A and to the contact 23 of a relay B. Contact 23' is connected to ground. Contact 24 of relay B is coupled to a positive D.C. voltage. Terminal 12 is connected through an electromagnet coil 25 of relay B to ground. In the static positions of relays A and B a range signal impressed on terminal 10 would be grounded through contacts 15 and 15'. A start signal impressed on terminal 11 would be ineffective to energize relay A since the circuit through coil 22 is open at 23 in relay B and at 16' through relay A. The relay B can be energized by a new range signal being impressed on terminal 12 closing contacts 23—23' in relay B, but this will not cause an actuation of relay A unless there exists a starting signal on terminal 11. If a starting signal does exist on terminal 11 at a time when a new range signal appears on terminal 12, relay B will be energized which will cause relay A to be energized, the activation of the latter relay A causing this relay to be locked up by a circuit grounding the coil 22 through the contacts 16—16' in relay A.

Contact 14' of relay A is coupled to a D.C. differentiating amplifier 29 which is in turn coupled by resistor 30 to a D.C. integrating amplifier 31 which amplifiers will later be described in detail. The amplifier 29 has a resistance 32 and a capacitor 33 connected in parallel therewith while the amplifier 31 has a condenser 34 in parallel therewith and a resistor 35 in a switched parallel circuit, the switch of which will later be described. The output of the amplifier 31 is coupled through a resistor 36 to a comparator range amplifier 37 which amplifier also has an input from a positive voltage source 38 through a potentiometer 39. Whenever the voltage coming via resistor 36 is greater than the voltage impressed through the potentiometer 39, the amplifier 37 will operate to energize a relay coil 40 of a relay C. The voltage supply of the coil 40 comes from a voltage source 41 through contacts 24—24' of relay B and is grounded through switch contacts 42—42' in a relay D. Relay C has four normally open contacts 45—45', 46—46', 47—47', and 48—48'. Contact 45 is connected to a positive voltage source and 45' is connected to an electromagnetic coil 50 of a relay E which is circuited to ground. The positive lead of coil 50 is also connected to contact 20' of relay A.

A timing integrating amplifier 55 is fed from a constant voltage through a potentiometer 56 and a resistor 57, the amplifier 55 having a condenser 58 connected in parallel therewith. The output of the amplifier 55 is connected to contact 46 of relay C and also is connected through a resistor to a comparing amplifier 59. The amplifier 59 is also fed from a constant positive voltage 60 through a potentiometer 61. The output of the amplifier 59 is through an electromagnet coil 62 of relay D to a voltage source 63. The relay D controls the single switch contacts 42—42'. Whenever the output potential of amplifier 55 is greater than the constant potential preset by the potentiometer 61, the amplifier 59 will energize the coil 62 to close contacts 42—42'. The output of amplifier 55 is also connected to contact 51, contact 51' being coupled through a resistor 64 to the input of amplifier 55 to short out this amplifier when contacts 51—51' are closed. Contacts 52—52' of relay E are connected in series with the resistor 35 to short out amplifier 31 when these contacts are closed. Contact 53 of relay E is connected to contact 46' of relay C and contact 54 of relay E is connected to contact 47' of relay C. Contacts 51—51' and 52—52' of relay E are normally open while contacts 53—53' and 54—54' are normally closed. Contact 53' of relay E is connected to contact 17' of relay A and is also connected to an isolation amplifier 70 through a resistor 71. A storage condenser 72 connects contact 53' to ground. Contact 54' of relay E is connected to contact 18' of relay A and is also connected to an isolation amplifier 73 through resistor 74. A storage condenser 75 is connected across contact 54' and ground. Whenever contacts 47—47' of relay C and contacts 54—54' of relay E are closed, the range information from the differentiating and integrating amplifiers 29 and 31, respectively, is stored in the storage condenser 75; and likewise, when contacts 46—46' of relay C and contacts 53—53' of relay E are closed, the increment of time information from amplifier 55 is stored on storage condenser 72.

The outputs of each of the isolation amplifiers 70 and 73 are each fed into a divider circuit 80, a detailed description of which will later be more fully described. The resulting quotient output of divider 80 is resistance coupled through an isolation amplifier 81 to a comparing amplifier 82, also resistance coupled. The output of isolation amplifier 81 is also connected to contact 83' of a relay F, contact 83' being connected to ground through a storage condenser 85 and to an isolation amplifier 86 through a resistance. Comparing amplifier 82 is also connected to contact 83' through a resistor so that it may compare the output potential of isolation amplifier 81 with the potential stored on the condenser 85. If the potential from the isolation amplifier 81 is greater than that stored on condenser 85, the amplifier 82 will function through its output circuit to a voltage source through an electromagnet coil 87 of relay F to throw contacts 83—83' closed and contacts 84—84' open. Contact 84' connects contact 83' and contact 84 connects contact 19' of relay A in order to ground the condenser 85 when no range signal is being computed.

The output of the isolation amplifier 86 is coupled as one input to a divider circuit 90, which is the same as divider circuit 80 and soon to be described. The output of the divider 90 is connected to contact 91' of a relay G which is normally open. Contact 91 is coupled through a resistor to an isolation amplifier 100. A normally closed back contact 91'' of relay G is connected to a voltage divider 93. The relay G also has normally open contacts 92—92', 92' being connected to a constant voltage source 94 through a resistance. The contact 92 connects the positive lead of an electromagnet coil 95 of relay G and the anode of a double triode tube 96b. The negative lead of the coil 95 in relay G is connected to the anode of the double triode tube 96a which is coupled to contact 21' of relay A. The grid of the double triode 96a is connected to contact 48' of relay C, which, when connected to contact 48, grounds the grid. Grid voltage is applied to 96a from a voltage source 97 through a resistor-capacitor parallel circuit. The grid of tube section 96b is connected to the cathode of tube section 96a through a resistor.

The range signal is fed to the divider 90 through an inversion amplifier 101 which is resistance coupled to terminal 10. The amplifier 101 has a resistance 102 connected across it.

The increment of range expressed in electrical quantities at the output of the integrating amplifier 31 is impressed on an amplifier 105 through a resistor coupling. These electrical quantities are always compared with a constant electrical potential from a voltage source 106 through a potentiometer 107. The output of the amplifier 105 is connected through an electromagnet coil 108 of a relay H which relay has normally closed contacts 109 and 109' supplying supply voltage to the contact 24 of relay A and contact 45 of relay C. If at any time the increment of range represented electrically at the output of amplifier 31 becomes positive or shows an increase greater than the potential fixed by the potentiometer 107 indicating that the target is leaving and the range is increasing, the amplifier 105 will actuate relay H to break the voltage source to the contacts 24 and 45 whereby relay E will not operate. In this manner the computer will only consider targets whose range is decreasing, or approaching targets.

Now considering the dividers and amplifiers shown in block in FIG. 1, it is to be noted that dividers 80 and 90 are alike; amplifiers 29, 31, and 100 are alike; amplifiers 55, 70, 73, 81, 86, and 101 are alike; amplifier 82 is of another type; and amplifiers 37, 59, and 105 are alike.

*Divider circuit*

Figure 2:
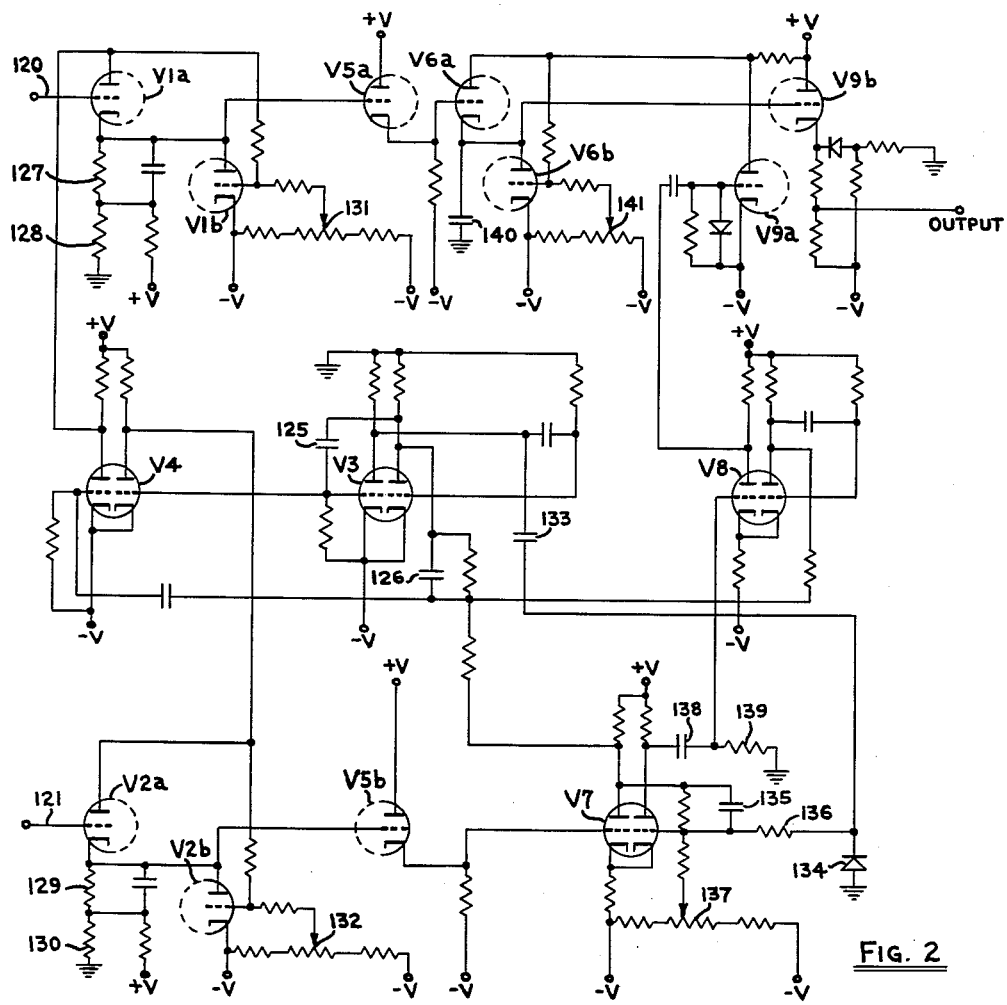
FIG. 2 is a schematic circuit diagram of the dividers shown in block in FIG. 1.

Referring now more particularly to FIG. 2 where the divider circuits for the elements 80 and 90 of FIG. 1 are shown, using divider 80 as an example, the output of amplifiers 73 enters by lead 120 and the output of amplifier 70 enters by lead 121. The outputs of these amplifiers are voltages representing the increments of range and time; that is, the increment of range, hereinafter referred to by $\Delta R$, is represented as a voltage at the output of amplifier 73 and the increment of time, hereinafter referred to by $\Delta t$, is represented as a voltage at the output of amplifier 70. $\Delta R$ and $\Delta t$ are voltages which are stored on the capacitors 75 and 72, respectively, and are proportional to an increment of range in yards $\Delta R$ which is preset on potentiometer 39 of amplifier 37 and the time $\Delta t$ in seconds which is required for the range to change by the amount $\Delta R$. These values are applied in steps as the increments of range and time signals progress. The input to the divider, then, is in D.C. voltages representative of increments of range and time.

The input 120 is applied to the grid of a double triode tube section V1a, and the input 121 is applied to the grid of a double triode tube V2a. These tubes are gated by a free running multivibrator tube V3 which is an asymmetrical plate coupled multivibrator operating at about 400 cycles per second. From the anode of V3b the gating pulses are applied to the grids of a double triode tube V4 through condensers 125 and 126, respectively. Tube V4 is normally conducting but upon the application of the negative going gate from tube V3, V4 is cut off. The anode voltage of tube V4 rises which in turn raises the voltage at the anode of V1a and V2a allowing those tubes to conduct for a period of about 1600 microseconds and at the same time gates tube sections V1b and V2b which are normally cut off. These tube sections constitute the load for tube sections V1a and V2a, respectively, in parallel with resistors 127, 128 and 129, 130, respectively, and determine the zero signal magnitude of the voltage at the grids of the double triode tube V5a and V5b. The value of this zero signal can be set by the adjustable resistance bias 131 for the ΔR channel and by the adjustable resistance bias 132 for the Δt channel. The cathodes of tube sections V5a and V5b serve as cathode followers to transfer the ΔR and Δt signals to the grids, respectively, of double triode tube sections V6a and V7a.

Considering now the Δt channel only, the voltage applied to the grid of V7a, just described, is proportional to Δt. V7 is a one shot cathode coupled multivibrator with the section V7b normally conducting. The gating pulses from the anode of tube section V3a of the free running multivibrator is applied after differentiating by the condenser 133 and the crystal 134 to the grid of tube V7b cutting V7b off and switching on V7a. The time that V7b is held cut off is dependent on condenser 135 and resistor 136, and the setting on the adjustable resistor 137 and the voltage on the grid of section V7a. The positive gating pulses on the anode of tube section V7b is differentiated by the condenser 138 and resistor 139 and passed to the grid of a double triode start-stop multivibrator V8a. The leading edge of the pulses triggers the start-stop multivibrator V8 while the trailing edge cuts off this tube. The negative gate at the anode of V8a blocks conduction in the double triode V9a and allows the anode voltage of V6a to rise and the tube to conduct. The conduction time is determined by the comparator tube V7. The output of the anode of tube V6a is integrated by the condenser 140 in the cathode circuit. As Δt increases the gate from the comparator V7 increases thereby reducing the conduction time of tube V6a and the integrated voltage output. A decrease in Δt increases the conduction time which increases the output voltage of tube V6a. By adjustment of the bias settings, the trip of the comparator tube V7, and by adjusting an adjustable resistor 141 for the grid of tube V6b, the output from the cathode of tube section V9b is made equal to $$K \frac{\Delta R}{\Delta t}$$

or a representative voltage equal to the resulting quotient. The heater circuits are not shown for the several tubes since these circuits are well known in the art and are not considered material to the description herein. The divider 90 is constructed in the same way with the range signal from amplifier 101 (see FIG. 1) being impressed at the lead 120 and with the above computed output of the maximum range rate represented as an electrical value at the output of amplifier 81 impressed on the lead 121. The output of divider 99, then, is the computed closure time or the computation of the range divided by the maximum range rate, $$\frac{R}{|R|_{Max.}}$$

*Amplifiers 29, 31, and 100*

Figure 3:
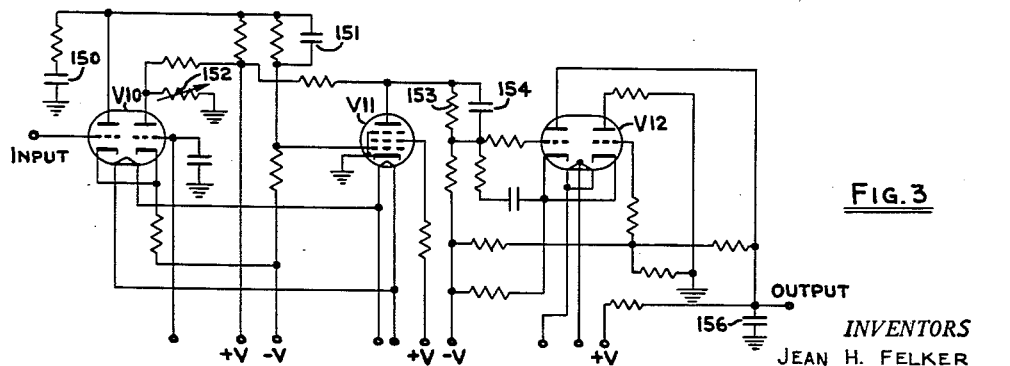
FIG. 3 is a schematic circuit diagram of the differentiating and integrating amplifiers used in the schematic diagram of FIG. 1.

Referring to FIG. 3 there is shown an amplifier circuit which is used as each of the amplifiers 29, 31, and 100 in FIG. 1. This amplifier has the equivalent of three stages in which the input signal is impressed on the grid of section a of a double triode tube V10, the anode of which is resistance coupled to the control grid of a second stage tube VII. The condenser 150 smooths out any high frequency pulses. Any quick changes of range signal, or like input signal, will pass through the condenser 151 to the grid of VII. The grid of section b of the tube V10 may be connected to an automatic zero setting means (not shown) where desired, or may be connected to ground and a zero adjustment made normally by the adjustable resistance 152 connected between the anode of tube section b and ground. The anode of tube VII is coupled through a resistance 153 and a condenser 154, in parallel, to the grid of a double triode tube V12a. The condenser 154 will pass quick changes of signal which would not ordinarily pass through the resistor 153. The cathodes of tube V12 and the grid and anode of tube section V12b are connected to a voltage dividing circuit to stabilize the system. The anode of tube section V12a is the output of the amplifier and is connected to ground through the condenser 156.

This amplifier is used as a differentiating amplifier at 29 in FIG. 1, the condenser 13 and the resistor 32 performing the differentiating functions in combination with the amplifier. Amplifier 31 has a resistor 30 and a condenser 34 to perform integrating functions in combination with this amplifier. This amplifier used at 100 performs no differentiating or integrating functions but operates as an isolating amplifier to the output closure time signal.

*Amplifiers 55, 70, 73, 81, 86 and 101*

Figure 4:
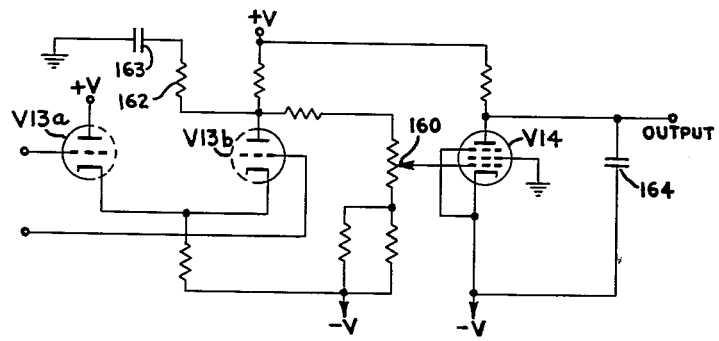
FIGS. 4 and 5 show schematic circuit diagrams of D.C. amplifiers shown in block in FIG. 1.

Referring now to FIG. 4 there is shown an amplifier circuit that is used for the amplifiers 55, 70, 73, 81, 86 and 101 in FIG. 1. Using amplifier 55 of FIG. 1 as an example, the input signal is impressed on the grid of the first section of a double triode tube V13a. The grid of tube V13b is grounded. The cathodes of the two tube sections are connected. The anode of tube section V13b is resistance coupled to the control grid of a pentode tube V14, one resistor 160 being adjustable. The last-mentioned anode is also serially connected through a resistor 162 and a condenser 163 to ground to smooth out and remove high frequency noises. The anode of tube V14 is connected to the cathode thereof through a condenser 164 to remove high frequency noise from the anode output. As may be seen in other applications of using this amplifier circuit in FIG. 1, the signal may be impressed on the grid of tube section V13b.

*Amplifier 82*

Figure 5:
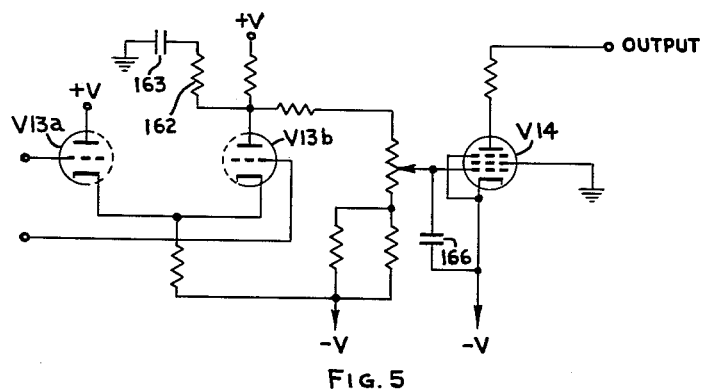

Referring to FIG. 5 there is shown an amplifier circuit which is used as amplifier 82 in FIG. 1. This amplifier circuit is similar to the amplifier circuit shown in FIG. 4, a condenser 166 being connected across the grid to cathode of tube V14 instead of the condenser connection 164 in FIG. 4.

*Amplifiers 37, 59 and 105*

Figure 6:
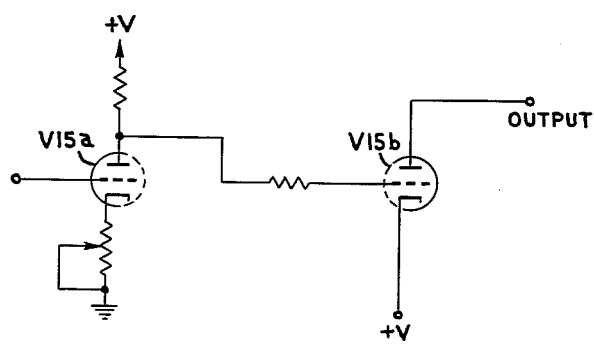
FIG. 6 shows a schematic circuit diagram of a D.C. amplifier shown in block in FIG. 1.

Referring now to FIG. 6 there is shown another D.C. amplifier circuit which is used for amplifiers 37, 59 and 105 in FIG. 1. In this circuit a double triode tube V15 is used with the input signal impressed on the grid of the tube section V15a. The anode of tube section V15a is resistance coupled to the grid of tube section V15b and the output amplified signal is taken from the anode of tube section V15b.

*Operation*

In the operation of the closure-time computer the terminal 10 is connected to the range output of a range device, as a radar range, which output is represented by a D.C. voltage proportional to range. Terminal 11 is connected to a voltage source through a switch for conditioning the computer to function upon receiving a new range signal. Terminal 12 is connected to the range device providing an output for each new step in range which range output steps are represented in voltages. The range signal may come continuously or periodically as the radar antenna rotates.

In the static condition in which no range signal has appeared on the terminal 12 and terminal 11 is switched with a potential thereon, all the relays A to H are unenergized and remain as shown in FIG. 1 except relay E which is energized through relay A contacts 20—20'. The range signal from terminal 10 is grounded through relay A contacts 15—15'; storage condenser 72 is grounded through relay A contacts 17—17'; storage condenser 75 is grounded through contacts 18—18' and storage condenser 85 is grounded through contacts 19—19'; amplifier 31 is short circuited through relay E, contacts 52—52' and amplifier 55 is shorted through contacts 51—51'; and amplifier 100 has a voltage impressed thereon of approximately 20 volts through relay G contact 91 and back contact 91". Voltage supply to several points in the circuit, as contact 20 in relay A and contact 45 in relay C, for example, is fed through relay H contacts 109—109'.

Upon receiving a range signal at terminal 12 the relay B is tripped which immediately trips relay A by establishing a circuit through coil 22 through relay B contacts 23—23'. Once relay A is tripped it remains so by its own holding circuit through the now closed contacts 16—16' until the voltage is switched off of terminal 11. Deenergization of relay B does not deenergize relay A. The energization or tripping of relay A connects the range signal from terminal 10 to amplifiers 29 and 31; breaks the grounded connections to storage condensers 72, 75, and 85 by disconnection of contacts 17—17', 18—18', and 19—19'; and relay E is deenergized by disconnection of contacts 20—20'. As long as relay B is energized the coil 40 of relay C is coupled to a voltage source through relay B contacts 24—24', but relay D must be deenergized before the amplifier 37 is able to energize relay C.

The timing signal is generated in a circuit including an integrating amplifier 55 which has an adjustable input from potentiometer 56. This amplifier 55 functions to produce increments of time, $\Delta t$, which increments are compared with a fixed value present at potentiometer 61 on amplifier 59. If the increment of time is greater than the pre-set value, amplifier 59 will operate to energize relay D closing contacts 42—42' for the circuit through coil 40 of relay C.

The range signal at the output of amplifier 31 is $\Delta R$, which, if larger than the pre-set value at the potentiometer 39 on amplifier 37, will cause amplifier 37 to operate to energize relay C. The energization of relay C permits the $\Delta R$ signal to be impressed on the storage condenser 75 and the $\Delta t$ signal to be impressed on the storage condenser 72. The potentiometer 39 is set so that the value of $\Delta R$ must be greater than several times the deviations of range error. The slow operating relay E thrown in circuit through relay C contacts 45—45' has sufficient delay to allow the storage condensers 72 and 75 to charge before relay E energization breaks the circuits of contacts 53—53' and 54—54', respectively.

If at any time the range is increasing, the $\Delta R$ value at the output of amplifier 31 would also be compared with a pre-set potential at potentiometer 107 which would cause energization of relay H through amplifier 105 to break the circuits to relay E and block any function of the system on an increasing range signal. That is, the system only functions for approaching targets.

The $\Delta t$ and $\Delta R$ values stored on condensers 72 and 75, respectively, are passed through their respective amplifiers 70 and 73 to the divider circuit 80 the output of which is the range rate or electrical value of $$\frac{|\Delta R|}{|\Delta t|}$$

This electrical value of range rate is passed to the relay F contact 83 and to the comparing amplifier 82 which will energize relay F if the electrical value of range rate from the divider 80 through amplifier 81 is greater than the electrical value stored on the condenser 85. If the electrical value of range rate on condenser 85 is lower, relay 85 will be energized by amplifier 82 to connect contacts 83—83' to place the new electrical value of range rate on condenser 85 which, in effect, keeps only the maximum value of range rate. This maximum value is passed through the amplifier 86 to the divider circuit 90. The range signal from the terminal 10 is passed through the inverting amplifier 101 to the divider circuit 90 out of which divider comes the electrical value of $$\frac{R}{\left|\frac{\Delta R}{\Delta t}\right|_{Max.}}$$

$$\frac{R}{|\dot{R}|_{Max.}}$$

which is the closure-time value. This closure-time value is impressed on the relay G contact 91' and upon the energization of relay C to close contacts 48—48' tube 96a fires. After a delay, tube 96b operates to energize relay G to switch amplifier 100 from the voltage source through contacts 91—91" to the closure-time value through 91—91'. The constant voltage at 93 on the amplifier 100 represents electrically a maximum time to close, for example, 200 seconds. Thus, since $$\frac{R}{|\dot{R}|_{Max.}}$$

is always less then 200 seconds, it may be said that the closure-time voltage always comes down from 200 seconds as a maximum to the instantaneously computed value. The output of the amplifier 100 is the electrical value of the minimum closure-time that may be utilized in indication, further computation, vehicle direction, gun direction, and the like as desired.

While many modifications and changes may be made in the constructional details and features of this invention without departing from the spirit and scope thereof, it is to be understood that we are to be limited only by the scope of the appended claims.

We claim:
1. A closure-time computer for given electrical range signals comprising, means for passing the range signals through differentiating and integration amplifier circuits, means for integrating a predetermined constant electrical value representative of increments of time coincident with integrated increments of range, means coupled to each of the integrated outputs for separately storing each electrical value, means coupled to the storage means for dividing the integrated range values by the integrated time values, means for storing the quotients of said division, means for comparing present quotient values with stored quotient values and for storing the greater value, and means for dividing the range signals by the maximum stored quotient values to produce an electrical value representative of the closure time whereby the minimum closure-time is continuously computed from range signals.

2. A closure-time computer for given electrical range signals comprising, means for differentiating and integrating the range signals, means for blocking the range signals whenever consecutive integrated range increments increase in value greater than a predetermined fixed value, means for integrating a predetermined constant electrical value representative of increments of time coincident with integrated increments of range, divider means coupled to the integrated range and time signals for dividing the integrated range signals by the integrated time signals, means coupled to said divider for storing the maximum value of the quotients, a second divider means coupled to said range signals and said storing means for dividing said range signals by said maximum quotient to produce values of minimum closure-time of targets whereby only the closure-time of approaching targets is computed.

3. A closure-time computer as set forth in claim 2 wherein said means for differentiating and integrating the range signals are serially connected amplifiers, the first having a resistance-capacitance differentiating circuit connected therewith and the second having a resistance capacitance integrating circuit connected therewith, and said means for storing the maximum value of the quotients is a storage condenser connectible by a normally open relay switch to the output of said condenser and an amplifier operative to close said relay switch wherever the divider output quotient is greater in value than the value stored on said storage condenser.

4. A closure-time computer as set forth in claim 3 wherein said means for integrating a predetermined constant electrical value representative of an increment of time comprises an amplifier having a predetermined constant voltage input integrated through a resistance-capacitance circuit coupled with said amplifier and a comparator amplifier coupled to said first-mentioned amplifier and to a potentiometer, said comparator amplifier controlling a relay switching means for switching the output of said first-mentioned amplifier to said divider means when the first-mentioned amplifier output is greater in value than the value set by the potentiometer.

5. A closure-time computer for computing the minimum closure-time from range signals comprising; means for differentiating and integrating the range signals; switchable means for connecting said range signals to said differentiating and integrating means; storage means for storing the integrated range signals; a second switchable means in a coupling between said signal integrating means and said storage means; means for producing increments of time, said means having comparator means for comparing said increments of time with a fixed value, the last said comparator means having means to disable said second switchable means wherever said increments of time are greater in value than said fixed value; divider means coupled to said storage means and to said means for producing increments of time, said divider means output being an electrical quotient; means connected to said divider means output for selecting and retaining the maximum electrical quotients; and a second divider means coupling said selecting and retaining means and said range signals for dividing said range signals by the maximum quotients producing electrical values of the minimum closure-time of a target represented by said range signal and the station of the closure-time computer.

6. A closure-time computer as set forth in claim 5 wherein said switchable and second switchable means are electrical relays and said means in said comparator means to disable said second switchable means is a relay controllable of a circuit through a relay of said second switchable means which last-mentioned relay controls the circuit through another relay of said second switchable means, the increment of time signal and the integrated range signal being passed through the contacts of both relays of said second switchable means whereby the integrated range signal is stored during the operation of said relays.

7. A closure-time computer for computing the minimum closure-time from range signals comprising; conductor means coupling the range signals through a differentiating circuit and an integrating circuit to a first storage means providing a range channel with means therein to select only increasing range signals; generating means for producing increments of time signals from a constant potential source; conductor means coupling said increment of time signals to a second storage means providing a time channel; a first relay means in said conductor means between said range signal and said differentiating circuit, and second and third relay means in said conductor means of said range channel between said integrating circuit and said conductor means of said time channel between said generating means and said second storage means, said third relay means being under the control of said first and said second relay means and said second relay means being under the control of said range channel, and the discharge of said first and second storage means being under the control of said first relay means to discharge said storage means when the range channel to said differentiating circuit is broken, and said third relay has shorting circuits therethrough to said integrating circuits in both said time and range channels which are alternately made with the time and range channel conductor means therethrough; a first divider means coupled to said first and second storage means with isolation means in each coupling; a third storage means coupled to the output of said first divider means with a fourth relay in said coupling, said fourth relay being under the control of a comparator of said first divider output and said third storage means to always store the maximum of the two values; and a second divider means coupled through an isolation means to the third storage means and through an inversion means to the range signals for dividing the range signals by the maximum stored value producing a quotient value representative of the minimum closure-time of the target producing the range signal, said quotient value being coupled through a fifth relay under the control of conduction means to an output means; and means coupled through said fifth relay for passing closure-time signals of less than a predetermined value whereby only approaching targets having a closure-time of a predetermined extent and less are considered.

8. A closure-time computer as set forth in claim 7 wherein said conduction means is associated with said first and second relay means to be conductive when the first relay is in position to couple the range signals with the differentiating amplifier and the second relay is in position to couple the time and range channels to their respective storage means, said conduction operating said fifth relay to couple said output quotient to said output means.

9. A closure-time computer as set forth in claim 8 wherein said isolating means are isolating amplifiers, said comparator of said first divider and said third storage means is an amplifier that operates to energize the fourth relay whenever the value of the first divider output is greater than the value in the storage means, and said inversion means between the range signal and the second divider is an inverting amplifier.

10. A closure-time computer as set forth in claim 9 wherein said means in said range channel to select only increasing range signals is a comparator amplifier which compares the electrical value of the range signal channel integrating means output with a fixed predetermined electrical value, the positive increase of the integrating means output over the fixed value causing said amplifier to operate an associated sixth relay to cut off the voltage sources to said second relay.

References Cited in the file of this patent
UNITED STATES PATENTS
2,656,977     Cummings _____ Oct. 27, 1953